June 20, 1967     M. F. GAUTREAUX     3,326,953
SEPARATION OF ALUMINUM ALKYL COMPOUNDS
Filed July 12, 1962
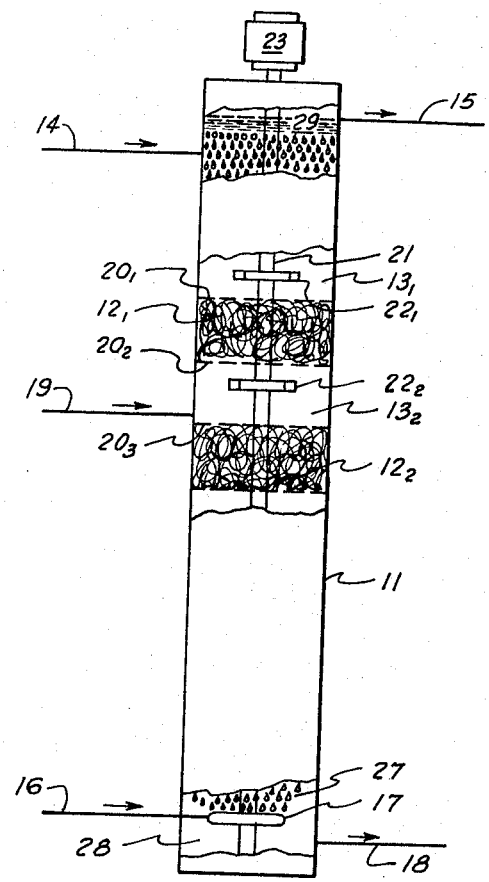

United States Patent Office 3,326,953
Patented June 20, 1967

3,326,953
SEPARATION OF ALUMINUM ALKYL
COMPOUNDS
Marcelian F. Gautreaux, Baton Rouge, La., assignor to Ethyl Corporation, New York, N.Y., a corporation of Virginia
Filed July 12, 1962, Ser. No. 209,331
10 Claims. (Cl. 260—448)

This invention relates to the separation of trialkyl aluminum compounds. More particularly, the invention relates to a new process for the separation of trialkyl aluminum components of a mixture wherein a separation according to an individual alkyl group length is achieved.

Background and problem

Of recent years, trialkyl aluminum compounds have assumed considerable present and potential importance as catalysts for the manufacture of polymeric olefin materials, for the synthesis of individual olefin hydrocarbons, for the generation of relatively long chain, but not polymeric, alpha-olefin hydrocarbons, for the manufacture of monohydric alcohols, and for other purposes. A number of the useful applications of trialkyl aluminum materials involve its utilization in a stoichiometric fashion. By this is meant that the trialkyl aluminum is processed or utilized in a stoichiometric manner relative to the product desired, rather than in a catalytic fashion. For example, trialkyl aluminum compounds can be converted to monohydric, primary hydroxy compounds by the oxidation of the trialkyl aluminum starting material to a trialkoxy compound, which is then hydrolyzed by water or a dilute aqueous acid. Such a process is described in Patent 2,892,858, issued to Karl Ziegler. Another so-called stoichiometric application of aluminum trialkyls as the starting material involves the preparation of alpha olefins by a two-stage series of operations. In this utilization, the first stage is the addition of ethylene molecules, in multiples, to each alkyl radical of a trialkyl aluminum feed material, whereby a new trialkyl aluminum is formed having longer alkyl groups than originally present. These longer alkyl groups can then be removed from the new trialkyl aluminum compound by several techniques. For example, the alkyl group can be "displaced" by reaction with an additional quantity of ethylene at appropriate conditions. Alternatively, trialkyl aluminum compounds can be thermally decomposed to yield olefin hydrocarbons corresponding to the alkyl groups thereon. Description of this latter utilization of trialkyl aluminum compounds is given in Belgian Patent 597,314 and Belgian Patent 594,803.

A common weakness of all processes utilizing trialkyl aluminum materials in a stoichiometric fashion arises from the fact that the alkyl groups, arrived at by chain-growth on originally shorter alkyl groups, are of a widely varying length or radical size. Thus, for example, when one starts with triethyl aluminum as a feed material, and provides a chain growth product by reacting with ethylene, the product includes trialkyl aluminum compounds having alkyl groups which, typically, can vary from 2 to 30 or 40 carbon atoms, the individual alkyl groups differing by multiples of two carbons, because of the increase in length by ethylene groups. The relative proportions of individual alkyl groups are in accord, generally, with Poisson distribution.

If the ultimate product to be derived from a stoichiometric use of a trialkyl aluminum mixture does not require a selected or restricted spectrum of molecular size, the foregoing feature, of distribution of proportions of alkyl groups of varying chain length, is of no great consequence. This, however, is not the usual situation. Normally, when the trialkyl aluminum is to be employed for making an alcohol product, or for making a branched chain olefin ocmpound, or for making a vinyl type alpha olefin, it is highly desired, or even mandatory, that the ultimate product be of relatively precise characteristics with respect to the molecular size. In other words, considering the synthesis of alcohols, the demand may well be for a relatively pure alcohol fraction of 12, 14, or 16 carbon atoms, or, of course, some other monohydric alcohol or mixture of specific molecular characteristics and size. If the trialkyl aluminum to be employed for making such alcohol has as alkyl substituents a mixture of alkyl groups forming the desired fraction and having only a small portion of such fraction, it necessarily follows that the desired alcohol product would then be obtained in only modest yield, as the alkyl groups corresponding to the undesired fractions would be subject to the same chemical attach, viz., oxidation and hydrolysis, as the desired alkyl aluminum groups or bonds.

A complicating factor which exists, in the problem of attempting to separate out compounds of fractions, from trialkyl aluminum mixtures, according to the length of alkyl groups present, arises from the high degree of mobility of the alkyl groups as entities. It is found that, owing to this mobility, or redistribution, that all possible trialkyl aluminum compounds predictable from the alkyl groups present can be expected to occur in any given mixture. Illustrating this factor more fully, if a mixture of triethyl aluminum and trihexyl aluminum, initially pure components, is established, when these materials attain equilibrium, the following compounds will be present at any one instant: triethylaluminum, diethyl hexyl aluminum, ethyl dihexyl aluminum, and trihexyl aluminum. It is immediately seen that if a mixture contains components of the alkyl groups varying from 2 to 30 carbon atoms, the mixture can have a vast number of differing trialkyl aluminum compounds at any one instant. This attribute thus mitigates against the separation from such mixture of any specific single trialkyl aluminum compound (wherein all the alkyl groups are identical) or any narrow cut or fraction wherein alkyl groups of a limited chain length range occur. It had been expected that any separation process would result in a separation of trialkyl aluminum compounds, according to the characteristics of the trialkyl aluminum molecular species, so that a separation by alkyl group lengths would be impossible.

A serious need thus has existed for an efficient method of separation of trialkyl aluminum compounds. More specifically, a great need has existed for a method of separating trialkyl aluminum components which is able to discriminate, in the separation, according to the individual alkyl groups of the alkyl aluminum moieties, rather than according to the identity of the trialkyl aluminum compounds themselves, which would reflect only the gross molecular weight of the trialkyl aluminum molecular species.

Objects

The general object of the present invention is to provide a new process for the separation of mixtures of trialkyl aluminum compounds. A more particular object is to provide a process whereby a mixture of trialkyl aluminum compounds, having a plurality of alkyl groups present and trialkyl aluminum constituents representing the numerical possibility arising from the different alkyl groups identifiable, can be resolved into two or more fractions, wherein the alkyl groups of the fractions are limited to a desired range. In other words, the object of the process is to provide a separation process capable of separation, not according to the average length of the three alkyl groups on the trialkyl aluminum constituents, but according to the length of the individual alkyl groups themselves. Alternatively expressed, the separation can be considered as a separation of alkyl aluminum moieties or groups, R$al$, wherein R is an alkyl group and $al$ is one-third equivalent of aluminum.

The full understanding of the invention, and of the best mode of carrying out the process of the invention, will be clear from the description and examples given hereinafter, in conjunction with the figure, which is a schematic representation showing a typical apparatus suitable for carrying out the process.

General definition and description

The process of the invention, in the most general form, comprises contacting, preferably, with agitation, a feed mixture of trialkyl aluminum components with a two-solvent system, and distributing the trialkyl aluminum constituents in the two solvent phases. Such contacting and distributing can be a single batch operation, but in most instances a plurality of successive interrelated stages, or the equivalent of a plurality of stages, is used to obtain a desired degree of separation. The two phases are separated, and the trialkyl aluminum content of each phase can be recovered as such if desired. Alternatively, in numerous cases, the separate phases can be processed further, or further separations of the trialkyl aluminum mixtures can be effected.

By trialkyl aluminum feed is meant a composition consisting essentially of or predominantly of compounds of the formula $R_3Al$ where each R is an alkyl group, a plurality of alkyl groups being present. Normally, the alkyl groups are straight chain groups, but the presence of branched chains is not precluded. The alkyl groups usually will include a substantial number of different alkyl radicals. For example, in typical mixtures, alkyl groups varying in size from 2 to typically 30 carbon atoms can be present. In more simplified situations, the feed may contain 2, 3, 4 or thereabouts, individual alkyl groups. In all cases, of course, the presence of at least two and usually a substantially higher number of alkyl groups is necessary for the process to have application. For full convenience and ease of understanding the problem and the present solution thereof, the term alkyl aluminum moiety is used herein, meaning the moiety R$al$. As already expressed, the alkyl groups in a mixture having a plurality thereof, are capable of redistribution. Thus, at equilibrium, a trialkyl aluminum mixture will contain a statistical distribution of the trialkyl aluminum species possible with the alkyl aluminum moieties present.

As an objective of the process is to accomplish a resolution according to alkyl groups, and as the alkyl aluminum moiety R$al$ is a convenient representation of a fragment or moiety containing a single alkyl group, it is used herein for convenience, particularly since an analysis of a mixture in such terms gives the same values as representing analysis in terms of trialkyl aluminum compounds, wherein all three alkyl groups of each component, are identical. Each contacting-separating step should involve a minimum finite time. This can vary with a particular system, but in most instances is at least about 30 seconds. The function of time is not fully understood, but it appears that, by providing adequate time per stage, that a separation is obtained which actually utilizes to advantage the ability of a mixture of trialkyl aluminum compounds to redistribute, even in solution in solvents. It is found that the separations actually experienced are in greater degree than that which would be encountered if the separation were on the basis of the molecular trialkyl aluminum species present in an original feed mixture.

The two solvents employed in the operation must exhibit certain attributes in the environment of operation. Firstly, two phases of different density must necessarily be established, even in the presence of the trialkyl aluminum being subdivided. Secondly, the solvents should be non-reactive, or substantially non-reactive with the trialkyl aluminum components and with one another, although the existence of mild complexes is not precluded. By non-reactive is meant that no significant degradation of the trialkyl aluminum constituents occurs at the temperatures of operation by reaction of either of the solvents. Lastly, the solvent pair should exhibit different selectivity toward the alkyl aluminum moieties present in the system. The solvent pairs may be and usually are partially miscible one with the other, and both of said solvents are solvents to a certain degree for trialkyl aluminum compounds or alkyl aluminum moieties. The first solvents employed according to the invention are members of the groups consisting of halo alkyl ethers, di-lower alkyl ethers of alkylene glycols including di-lower alkyl ethers of polyalkylene glycols, dioxane, dioxolane, and alkyl substituted dioxanes. The second solvent is a hydrocarbon usually of a substantially paraffinic character. Pure hydrocarbons can be employed, such as n-decane, or dodecane and other paraffins of from 3 to about 22 carbon atoms. Normally solid aliphatics are, of course, usually avoided as pure solvents. The hydrocarbon can be a very volatile liquid, or even gaseous at normal temperatures, in which case low temperatures and pressure operation are employed. For many embodiments commercially available, highly refined white oils, are used.

The trialkyl aluminum feed is, as stated, contacted usually with agitation with this two-solvent system and the trialkyl aluminum constituents are distributed in the two phases. The intermixed phases are then separated providing separated phases, these being a first solvent rich phase and the second solvent rich phase. The distribution of alkyl aluminum moieties results in the first solvent phase being enriched in the lower alkyl aluminum moieties, and the second solvent phase being enriched in the higher alkyl aluminum moieties.

The phases thus established can be immediately contacted again with opposite phases from corresponding operations, in countercurrent fashion. Likewise, continuous countercurrent contacting can be employed, giving the equivalent of a multiplicity of separated batch stages.

The composition of the solvents in the phases, and the relative amounts thereof is, of course, affected by a number of factors. Inherent limiting factors are the quantity of feed, and the relative amounts of the several alkyl aluminum moieties. Other factors which can be varied, at least to some degree, in effecting a separation, are the identity and proportions of the solvents, the number of contacting-separating stages or equivalents employed, the temperature of operation, and other factors, these being discussed in more detail hereinafter.

The so-formed phases can be processed further, without separation of the alkyl aluminum components. Thus, the alkyl aluminum groups in the hydrocarbon rich phase can be oxidized, then hydrolyzed and the alcohols thus formed can be separated from the solvents by distillation fractionation. Alternatively, the above described separation procedure can be followed by the separation of the solvent components from the trialkyl aluminum constituents found in each phase, after separation of the two solvent layers.

Description of figure

The figure illustrates schematically typical apparatus employed in numerous embodiments of the process. Referring to the figure, apparatus is shown wherein a plurality of stages are provided by means hereafter described. The principal element of the apparatus is the extractor column shell 11. The interior thereof is divided into vertically arranged stages including a packed section and a mixing section in each stage. The boundaries of the stages are established by grid members, 20₁, 20₂, 20₃, which grid members also serve to hold in place packing material forming the packed section 12₁, 12₂ of the several stages.

Projecting downwardly through the entire length of the column is a shaft 21, driven by an externally mounted motor 23, and having agitator elements 22₁, 22₂ mounted thereon and rotating, when the column is in operation, in the open sections 13₁, 13₂ of each stage.

Conduits or lines to and from the extractor include a higher density or heavy solvent feed line 14, for feed at the top of the column, and a lower density, or light solvent extract line 15, for discharge of a light solvent phase at the top of the column. A feed line 19 is provided at some intermediate point in the column although in some embodiments feed is provided at the top or bottom of the column. At the bottom of the column a feed line 16 is provided for the light solvent feed, which is further distributed into the interior of the column by a distribution ring 17. A heavy solvent phase discharge line 18 is provided for discharge at the bottom of the column.

In operation, typically, the feeds to the column include a hydrocarbon solvent feed through line 16 which is distributed as a discontinuous phase 27, of rising globules or droplets, in a continuous phase comprising the heavier solvent-rich phase. A feed is provided through line 19 which can be either the undiluted crude trialkyl aluminum feed, or a solution of trialkyl aluminum in either of the two solvents employed. At the top of the column the heavy solvent is fed through line 14 and a stratified top layer 29 of the lighter solvent phase is drawn off by the discharge line 15.

As already noted the mechanical configuration of the apparatus employed, specifically, the extraction or contacting column proper, is not a limiting feature of the process. Columns of the character above described resemble those disclosed by Scheibel in U.S. Patent 2,493,265. In the column, the ascending droplets of the discontinuous phase 27, and the descending stream of continuous phase pass sequentially through zones of vigorous agitation, provided by the above mentioned agitator elements 22₁, 22₂, and immediately thereafter, through the packing in the packed calming sections 12₁, 12₂. The sections allow re-coalesence of the intimately mixed phases from the next above mixing section (in the case of the heavier solvent phase) and the next below mixing section (in the case of the lighter solvent phase).

The following examples illustrate more specifically the operation of the process.

EXAMPLE 1

In this operation, a multi-stage extractor was used corresponding in construction to the above described column, and having a total of 92 stages. The feed line 19 was provided at the 65th stage from the column top. The feed mixture was a mixture of trialkyl aluminum compounds, the analysis represented below in terms of mole percent of the alkyl groups or alkyl aluminum moieties, present. As previously discussed, a characteristic of trialkyl aluminum mixtures is the potential redistribution of the components, so that, at equilibrium, a statistical distribution of every possible component will exist at any given time. Accordingly, for example, although the objective of virtually all embodiments of the process is to isolate either a trialkyl aluminum stream limited in composition to alkyl aluminum moieties ($R_3al$ groups) wherein the alkyl, such as, for example, tridodecyl-aluminum (($C_{12}H_{23}$)$_3$Al), or a mixture of trialkyl aluminum components having a limited range of alkyl group lengths, the most realistic method of presenting a mixture composition is as given below, viz.; to cite the relative proportions of alkyl groups present:

| Alkyl group | Mole percent | Corresponding alkyl aluminum grouping | Weight percent |
|---|---|---|---|
| Ethyl, $C_2$ | 22.6 | Ethyl aluminum | 5.5 |
| Butyl, $C_4$ | 10.0 | Butyl aluminum | 4.8 |
| Hexyl, $C_6$ | 12.5 | Hexyl aluminum | 8.9 |
| Octyl, $C_8$ | 10.8 | Octyl aluminum | 10.2 |
| Decyl, $C_{10}$ | 12.0 | Decyl aluminum | 14.3 |
| Dodecyl, $C_{12}$ | 10.9 | Dodecyl aluminum | 15.5 |
| Tetradecyl, $C_{14}$ | 8.4 | Tetradecyl aluminum | 14.0 |
| Hexadecyl, $C_{16}$ | 6.2 | Hexadecyl aluminum | 11.3 |
| Octadecyl, $C_{18}$ | 3.8 | Octadecyl aluminum | 7.7 |
| Eicosyl, $C_{20}$ | 1.8 | Eicosyl aluminum | 4.2 |
| Higher, $C_{22}$ and + | 1.0 | Higher aluminum | 2.6 |
| | | | 100.0 |

The solvents used in this operation were bis($\beta$-chloroethyl) ether and a commercial, aliphatic white-oil solvent having a specific gravity of about 0.85 (Marcol 70, Humble Oil and Refining Co.) and having an average molecular weight corresponding to about a $C_{19}$. The mixture of trialkyl aluminum compounds, having the above given equivalent composition, was fed at the feed stage through line 19, dissolved in a portion of the bis($\beta$-chloroethyl) ether.

The major part of the bis($\beta$-chloroethyl) ether solvent was fed at the top of the column through line 14, at a rate of about 170 lb./(ft.$^2$) (hr.), and formed the continuous liquid phase. The additional quantity fed with the aluminum alkyls through the feed line 19, raised the total throughout of bis($\beta$-chloroethyl) ether to about 220 lb./(ft.$^2$) (hr.).

The hydrocarbon solvent was fed through the bottoms feed line 16 at the rate of about 30 lb./(ft.$^2$) (hr.). The trialkyl aluminum feed rate was about 1.4 lb./(ft.$^2$) (hr.), giving a volumetric ratio, of the hydrocarbon to trialkyl aluminum feed, of about 20/1. The column was maintained at a temperature of about 25° C., and operation was continued for several hours at substantially uniform conditions. The peripheral speed of the agitator elements 22₁, 22₂ . . . during this operation was about 0.4 ft./second. Atmospheric pressure was used.

The bis($\beta$-chloroethyl) ether solvent was the continuous phase, the hydrocarbon phase being the discontinuous phase of droplets rising in the column. In the course of processing, the relative volume of the several phases is appreciably altered, owing to the solubility of a portion of the hydrocarbon in the bis($\beta$-chloroethyl) ether, so that the volumetric ratio of the ($\beta$-chloroethyl) ether phase, discharged through line 18, to the hydrocarbon phase, discharged through line 15, was substantially raised to about 10:1.

Portions of the discharge phases were retained as samples and analyzed for the distribution of alkyl groups of the trialkyl aluminum components dissolved in each phase with the following results.

COMPOSITIONS EXPRESSED IN TERMS OF WEIGHT CONCENTRATIONS OF R$_3$Al, WHERE R=ALKYL GROUP

| Carbons in alkyl group R | In feed | In oil phaseout | In bis($\beta$-chloroethyl) ether phaseout |
|---|---|---|---|
| 4 | 6.3 | 0.5 | 5 |
| 6 | 11.2 | 1.5 | 17.7 |
| 8 | 13.1 | 3.0 | 20.5 |
| 10 | 18.1 | 7.0 | 20.7 |
| 12 | 19.3 | 21.5 | 18.2 |
| 14 | 17.4 | 34.0 | 11.0 |
| 16 | 14.3 | 32.5 | 7.8 |

In addition to the alkyl groups of 4 to 16 carbon atoms, inclusive, reported above, the feed of trialkyl aluminum components also included minor concentrations of ethyl radicals, and of alkyl radicals of 18 and more carbon atoms. These groups are not reported above, because restriction of the concentrations to the 4 to 16 carbon atom alkyl groups shows more clearly the high degree of effectiveness of the process. Expressing the above results in a different manner, the ratio of trialkyl aluminum components having from 12 to 16 carbon atom alkyl groups, to trialkyl aluminum components containing 4 to 10, inc., carbon atom alkyl groups, was as follows: in feed: 1.04; in oil phase overhead: 7.3; in solvent phase bottoms: 0.59.

It is thus seen that the present process provides a highly efficient operation in resolving trialkyl aluminum mixtures. If desired, the operation can be extended to achieve a virtually complete elimination of non-desired components, as is shown by the following example.

EXAMPLE 2

The operation of Example 1 is repeated, using the same feed source and the operating conditions described. However, a total of about 300 stages are provided, in this case the hydrocarbon phase overhead is virtually free of alkyl aluminum moieties having up to eight carbon atoms. In other words, the weight ratio of $C_{12-16}$ groups to $C_{4-10}$ groups, in the hydrocarbon phase discharged, is increased to about 100:1. In addition, the hydrocarbon phase contains about 95 percent of the dodecyl aluminum moieties fed to the process. The split of higher and lower alkyl aluminum moieties is even higher than the above mentioned split of the dodecyl aluminum groups.

The usual objective of all embodiments of the invention is to obtain a desired degree of separation of one fraction, in terms of alkyl groups of the alkyl aluminum moieties, from another group in the feed mixture. Thus, in the foregoing examples, it was desired to separate a fraction of dodecyl through hexadecyl aluminum moieties from the lower alkyl aluminum moieties. For more specific characterization of an embodiment, it is convenient to express the performance in terms of an alkyl aluminum moiety which is split, that is, its concentration in the hydrocarbon solvent phase being about the same as the concentration in the first solvent phase discharged. In other words, the ratio of concentrations of that particular moiety, in the two outlet phases is unity. In the case of Example 1, the split was at the tetradecyl aluminum moiety. The distribution of other alkyl-aluminum groups was as follows:

|  | Ratio of concentrations in hydrocarbon phase to first solvent phase |
|---|---|
| $C_{16}$ al | 15:1 |
| $C_{10}$ al | 0.08:1 |
| $C_8$ al | 0.02:1 |
| $C_6$ al | 0.015:1 |

Generally, the point of "split" will be the same for a given ratio of the two solvents, but the split of other components will be effected by the number of stages employed. To separate a given fed mixture at a different split point, the proportions of the two solvents can be varied.

To illustrate further the scope of the invention, the following examples recite further operations using various "first" solvents with the same hydrocarbon as the second solvent.

| Ex. | First solvent | Volume ratio first solvent: second solvent | Stages | Approximate point of split |
|---|---|---|---|---|
| 3 | Bis(β-chloroethyl) ether | 6.5 | 60 | $C_{12}$ |
| 4 | Dimethyl ether of ethylene glycol | 2.5 | 100 | $C_{18}$ |
| 5 | 1,4-dioxane | 4.0 | 30 | $C_{14}$ |
| 6 | 1,3-dioxolane | 8.0 | 140 | $C_{10}$ |

In addition to the specimens of first solvents specifically illustrated above, numerous other solvents are available and can be successfully employed. In addition to bis(β-chloroethyl) ether and 1,2-bis(β-chloroethoxy) ethane, others of this group which can be employed with good results are β-chloroethyl ethyl ether; β,β-dichloroethylethyl ether; bis (β-chloroisopropyl) ether; α,β-dichloroethyl ethyl ether; β,β,β-trifluoroethyl methyl ether and bis(β,β-difluoro ethyl) ether. Usually, compounds are preferred wherein the halogen substituents are chlorine or fluorine since the bromine or iodine containing compounds are more apt to attack the alkyl aluminum bonds, unless especially low operating temperatures are employed. In such instances, the lower temperatures increase the viscosity of the liquids, so that efficient mixing, and disengagement of the solvent phases is somewhat hampered. In addition to the haloethyl ethers illustrated, similar compounds comprising halo propyl and halo butyl ethers are suitable. Generally, however, the beta halogenated ethyl ethers are substantially preferred.

With respect to the di-lower alkyl ethers of alkylene glycols, similar additional representatives of this class can be employed. The diethyl, dimethyl, dipropyl, di-n-butyl and diisobutyl ethers of ethylene, propylene and n-butylene glycol can be employed. Dioxolane, which is the methylene ether of ethylene glycol can also be used. Similar dialkyl ethers having two different alkyl groups can be used, such as, for example, methyl ethyl, methyl propyl, ethyl propyl, or ethyl butyl ethers of ethylene glycol. Generally, alkyl groups of more than four carbon atoms are less desirable, because the higher alkyl groups impart a greater hydrocarbon character to the material so that there is a greater tendency to be miscible with the hydrocarbon solvent.

Similarly, with the lower alkyl ethers of polyalkylene glycols, other members of this group can be used with equal effectiveness. The dimethyl ether of diethylene glycol has already been mentioned. Dioxane and alkyl substituted dioxanes are also suitable. Other examples of solvents in this group are the dibutyl ether of diethylene glycol, the ethyl-methyl ether of diethylene glycol, and the dimethyl ether of triethylene glycol.

With respect to the second solvent, as already mentioned, a normally liquid hydrocarbon is employed, preferably one of the commercially available, highly refined white oils, which are virtually free of aromatics and unsaturates. Typical properties of a suitable white oil, Marcol 70, are the following:

| Viscosity | 69 SS at 100° F. |
|---|---|
| Specific gravity | 0.8532 at 60° F. |
| Cloud point | 20° F. |
| Pour point | 10° F. |
| Distillation range | 543/846° F. |

Such a white oil is available as the tradenamed solvent Marcol 70. Other white oils, having similar chemical characteristics (free of unsaturates and aromatics) are available with a wide range of physical properties. Among the most significant physical properties are the viscosity of the oil and the specific gravity. Illustrative of the range of materials available as commercial "white oils" are those having Saybolt second viscosities, at 100° F. of as low as 32 and as high as about 350. The preferred range of viscosities is from 50 to 150 SS at 100° F.

As previously indicated, the hydrocarbon solvent used can be a pure compound, even a pure compound which is a vapor at ambient conditions. The identity of the hydrocarbon solvent affects the operating conditions employed, inasmuch as, with the more volatile hydrocarbon, lower temperatures are frequently required, as well as pressure operation, to assure two-phases existing, and the preservation of the hydrocarbon in a liquid phase. Illustrative of the wide choice of hydrocarbon solvents, the following table cites those demonstrated to be compatible with dioxolane:

| Hydrocarbon: | Temperature for Two phases, ° C. |
|---|---|
| Marcol 70 white oil SS 69 at 100° F. | >30 |
| Bayol D–white oil 32 SS at 100° C. | −4 |
| Trimethyl hexane | −22 |
| Isooctane | −19 |
| n-Heptane | −16 |
| Neohexane | −27 |
| n-Pentane | −24 |
| Petroleum ether | −24 |

*Discussion and variables*

As evident from the foregoing, appreciable variation in the precise conditions of operation, solvents, and the several operating factors is permissible without departing from the scope of the invention.

The solvents suitable have already been discussed. Not only the identity of the individual solvents, but also the effectiveness and compatability of a particular solvent pair is of importance. A quick indication of the effectiveness of a given solvent pair, for a particular separation, can be obtained as follows. Equal portions of the first and second solvents, and a specimen of the trialkyl aluminum feed mixture, are agitated in a separatory funnel, and the mixture is allowed to settle and to separate into two liquid phases. The phases are then separated and then analyzed for trialkyl aluminum content. Analysis is usually by hydrolysis of an aliquot portion, which results in decompositions of the alkyl aluminum moieties into the corresponding alkane hydrocarbon, e.g., $$(C_6H_{13})al + H_2O \rightarrow C_6H_{14} + alOH$$

The alkane hydrocarbon is stripped from the liquid phase by inert gas stripping, or heating, and the identity and concentration determined by vapor phase chromatography. The proportions of alkyl aluminum moieties in each phase are thus readily determined.

Comparison of the concentrations of alkyl aluminum moieties in the several phases provides data allowing calculation of the number of stages required to implement a separation. The degree of distribution can be expressed as follows. Considering two adjacent length, alkyl aluminum moieties, n-octyl aluminum and n-hexyl aluminum, the ratio of the mole fractions in the several phases express the partition of these components, thus $D_8 =$

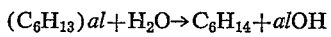

mole fraction of n-octyl aluminum, hydrocarbon phase / mole fraction of n-octyl aluminum, solvent phase and $D_6$ represents the same relationship for n-hexyl aluminum. The ratio of the particular distribution coefficients, $D_8/D_6$ is termed the separation coefficient, $\beta$.

It has been discovered that the foregoing expression is reasonably constant, in a given solvent pair system, for different pairs of adjacent alkyl aluminum moieties. In other words, $$D_8/D_6 = D_{10}/D_8 = D_{12}/D_{10} = D_{14}/D_{12} = D_{16}/D_{14}$$

In view of the foregoing relationship, with one set of values, for a single stage contacting, it is possible to calculate the distribution of virtually all components of a mixture. Further, by stage wise calculations, it is possible to calculate the number of successive contactings and rephasings to obtain a desired degree of separation.

The separation coefficients, $\beta$, can be used in generalized equations, as follows $$N = \frac{(2 \ln x/y)}{(\ln \beta)} - 1$$

In the foregoing expression
$N$=number of stages required
$x$=the weight ratio desired for two adjacent alkyl aluminum components in the second solvent phase discharged (e.g. $C_{10}al/C_{12}al$),
$y$=the weight ratio desired for the components in the first solvent phase discharged;
$\beta$=separation coefficient as experimentally determined.

The foregoing expression thus gives a good prediction of the requisite number of stages for a given separation required. When the ratio of the two solvents varies appreciably, depending upon the stage involved, the expression loses some of its accuracy, but is nevertheless suitable for approximate calculations.

As an illustration of a one stage separation to obtain the value of separation coefficients in a typical system, the following example is given.

EXAMPLE 7

About six parts of a trialkyl aluminum mixture was contacted with 30 parts by volume, each, of dioxolane as the first solvent, and n-heptane as the second solvent. After stratification, the alkyl aluminum component concentrations in the two phases were determined. The following table shows the results obtained.

| Alkyl aluminum | Weight percent of feed | Distribution of component—wt. percent in heptane phase, wt. percent in dioxolane phase |
|---|---|---|
| Ethyl | 2.2 | |
| Butyl | 9.5 | 0.725 |
| Hexyl | 18.6 | 0.76 |
| Octyl | 19.9 | 0.822 |
| Decyl | 17.5 | 0.97 |
| Dodecyl | 10.2 | 1.07 |
| Tetradecyl | 5.2 | 1.16 |
| Hexadecyl | 2.2 | 1.38 |
| Octadecyl | 0.8 | |
| Eicosyl | 0.3 | |

As already indicated, the actual techniques used in contacting the two solvent phases can be varied. The method can involve a column having discrete compartments, as in Example 1. Alternatively, a column may be divided by perforated plates, to achieve good mixing at staged intervals, as the solvent phases flow countercurrently. Packed columns can be used, although it is found that the relative efficiency is lower. In certain cases, a multiplicity of single extraction vessels are advantageously used. Generally, as clear from the foregoing data in the examples, the various embodiments of the process are carried out at low or ambient temperatures. Higher temperatures are disadvantageous for several reasons. First, the increase in temperature tends to increase the miscibility of the two solvents one with the other. In addition, the case of some examples of the first solvent, reaction will occur at elevated temperatures. Thus, in the case of bis($\beta$-chloroethyl) ether, temperatures of above about 100° C. should be avoided. In the case of dioxolane, temperatures below 140° C. and preferably below 100° C. should be maintained.

As previously discussed, the two solvent phases removed from any operation can be utilized as such, for the alkyl aluminum content, and in other cases it will be found desirable to separate the alkyl aluminum components therefrom. Separations will normally be carried out by fractionation, usually at sub-atmospheric pressures, to avoid temperatures which might result in decomposition of the alkyl aluminum components therein. In certain cases, the alkyl aluminum content can be readily crystallized out of the solvent phase.

It will be apparent that a difference in density of the two solvents, and of the phases formed in the operation, is necessary. Generally, the first solvent is more dense and forms the more dense phases during operation. Hence, in multi-stage operations carried out in vertical series arrangement, the fresh or recovered first solvent is fed at the top, as in some of the examples herein, the second solvent being fed at the bottom.

What is claimed is:

1. A process of separating a trialkyl aluminum mixture consisting of moieties represented by the expression R*al*, wherein R*al* is a moiety having alkyl group R and *al* is the monovalent equivalent of aluminum, a plurality of different length alkyl groups being present, said process comprising contacting the trialkyl aluminum feed with a two-solvent system consisting essentially of a first solvent selected from the group consisting of haloalkyl ethers, and di-lower alkyl ethers of glycols, the second solvent being a paraffin hydrocarbon, the first solvent being further defined in that it is non-reactive at contacting conditions with the alkyl aluminum, and forms a separate phase with the second solvent in the presence of the trialkyl aluminum, and distributing thereby the R*al* moieties in the two phases thus formed, the first solvent phase being enriched in the shorter alkyl R*al* moieties and the second solvent phase being enriched in the longer alkyl R*al* moieties, and separating said phases.

2. The process of claim 1 wherein the first solvent is bis($\beta$-chloroethyl)ether.

3. The process of claim 1 wherein the first solvent is $\beta$-chloroethyl ethyl ether.

4. The process of claim 1 wherein the first solvent is 1,2-bis($\beta$-chloroethoxy)ethane.

5. The process of claim 1 wherein the first solvent is $\alpha,\beta$-dichloroethyl ethyl ether.

6. The process of claim 1 wherein the first solvent is $\beta,\beta$-dichloroethyl ethyl ether.

7. The process of claim 1 wherein the first solvent is bis($\beta,\beta$-difluoroethyl)ether.

8. The process of claim 1 wherein the first solvent is bis($\beta$-chloroisopropyl)ether.

9. The process of claim 1 wherein the first solvent is $\alpha,\beta$-dichlorooctyl ethyl ether.

10. The process of claim 1 wherein the first solvent is $\beta,\beta,\beta$-trifluoroethyl methyl ether.

No references cited.

TOBIAS E. LEVOW, *Primary Examiner.*